Sept. 4, 1928.　　　　　　　　　　　　　　　　　　1,682,873
A. F. VICTOR
CAMERA
Filed June 24, 1926　　　　3 Sheets-Sheet 1

Witness
Chas. R. Koursh.

Inventor
Alexander Ferdinand Victor,
Thomason & Lundy Attys.

Sept. 4, 1928.
A. F. VICTOR
1,682,873
CAMERA
Filed June 24, 1926    3 Sheets-Sheet 2
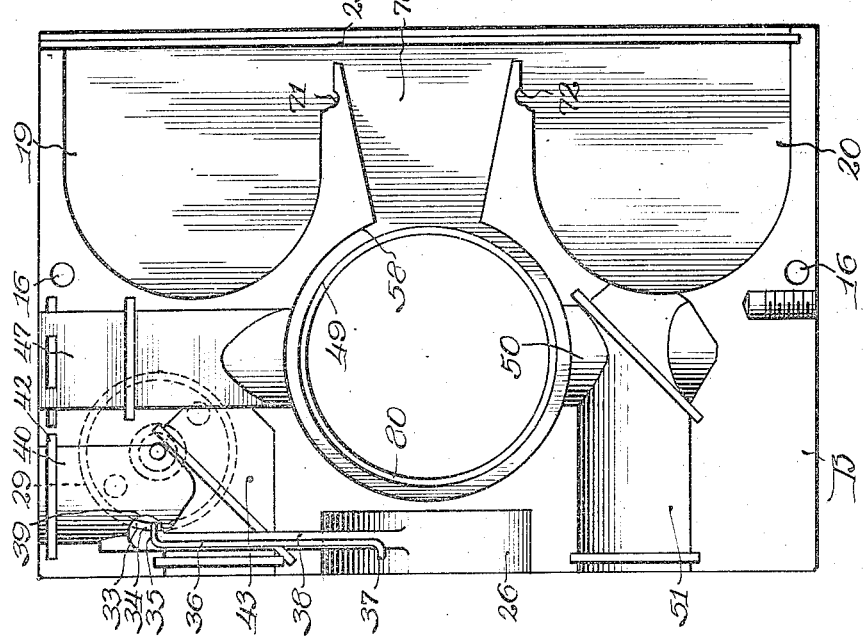
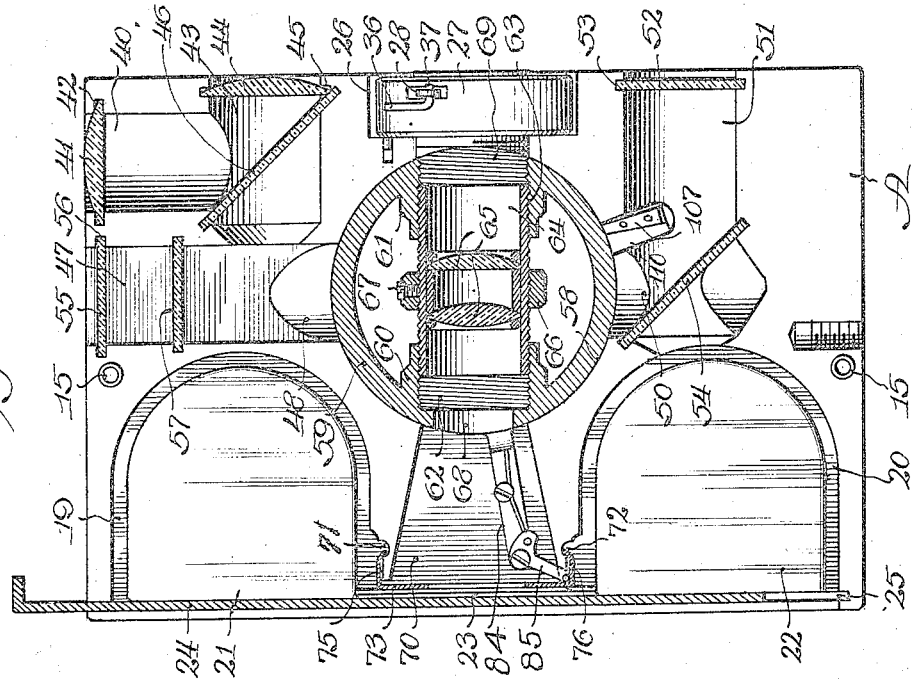
Witness
Chas. R. Hursh
Inventor
Alexander Ferdinand Victor
Thomason & Lundy Attys Sept. 4, 1928.  
A. F. VICTOR  
CAMERA  
Filed June 24, 1926
1,682,873
3 Sheets-Sheet 3
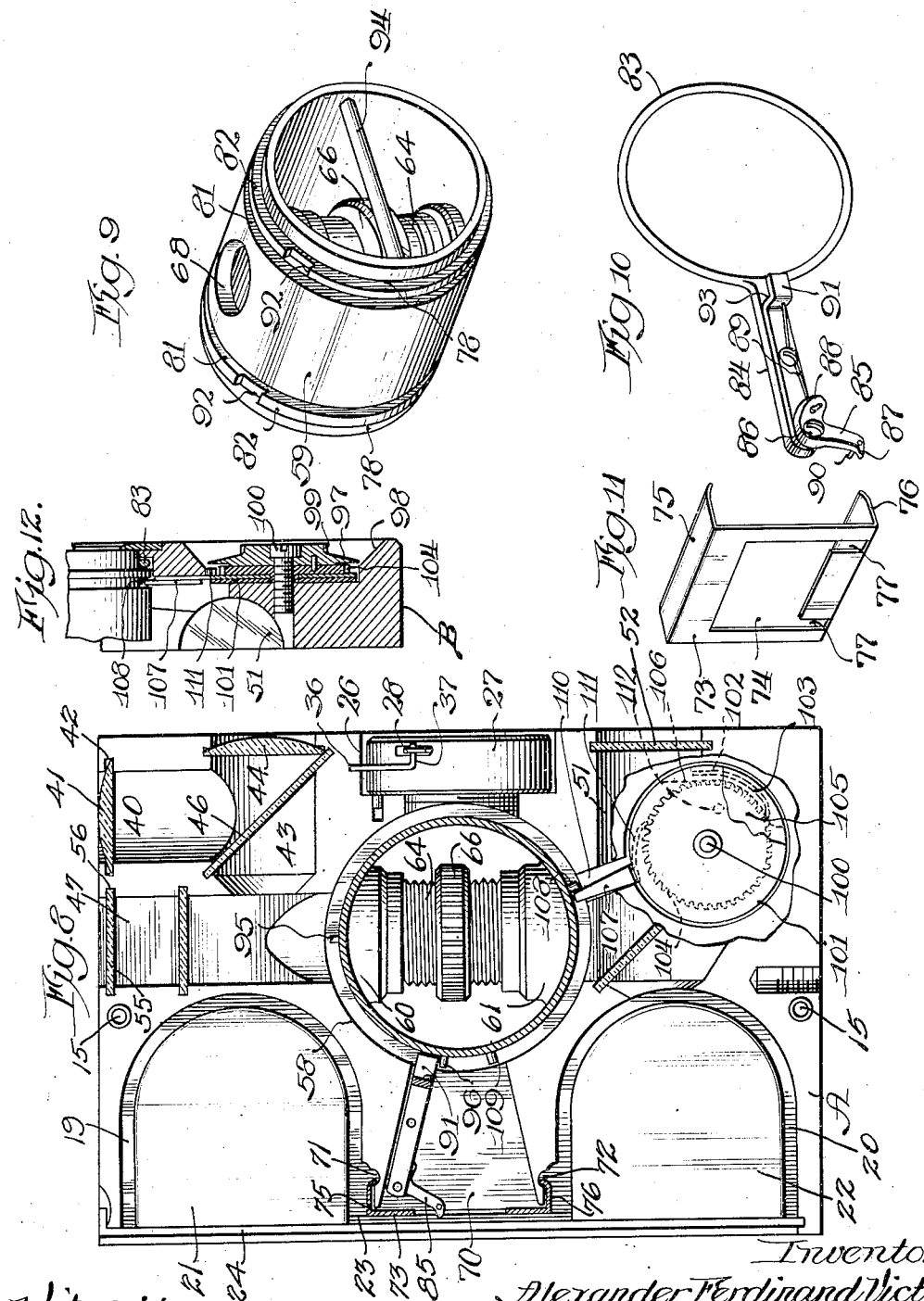

Patented Sept. 4, 1928.

1,682,873

UNITED STATES PATENT OFFICE.

ALEXANDER FERDINAND VICTOR, OF DAVENPORT, IOWA.

CAMERA.

Application filed June 24, 1926. Serial No. 118,253.

My invention relates to cameras and has more particular reference to a photographic camera for taking impressions upon a film which is in the form of an elongated sensitized strip, preferably of the type used for cinematographic purposes.

One of the objects of my invention is to provide a camera in which there may be stored several feet of standard or commercial motion picture negative film and the film may be moved step-by-step by mechanism that is associated with and actuated by a movable lens for the purpose of exposing in successive manner a number of negatives of the "still" type. Another object resides in providing means that will move the film each time the camera is focused so that the liability of a double exposure on a single negative will be avoided. A further object resides in providing a camera wherein the photographic lens is employed in conjunction with a finder and the lens is focused with its axis in one plane and it is then moved to a position with its axis in another or transverse plane for the purpose of exposing the negative. Still another object resides in providing, in connection with the before-named structure, a reliable and dependable means for indicating the number of negatives that have been exposed so that the operator may readily ascertain when the end of the strip of film has been reached. In connection with the focusing of the lens and its movement to a position where the negative will receive the image, I have provided a co-operation between the lens-carrying element and the film-moving mechanism, so that the movement of the lens-carrying element is transmitted to the film to move the next area of the negative into a position for exposure. Further objects reside in providing a camera of extremely compact and novel arrangement, that is small in size, so that it may be readily inserted and carried in a pocket of the user's clothing; that is easy to operate and is simple in construction; has a minimum of parts that are dependable in their operation; and I also have in mind, in connection herewith, the production of a camera having the above-mentioned characteristics that may be manufactured and placed upon the market at a reasonable price.

I prefer to carry out my invention and to attain the divers objects thereof in substantially the manner hereinafter described and as more particularly pointed out in the claims, reference here being made to the accompanying drawings that form a part of this specification.

In the drawings:

Figure 6 is an interior view in plan or elevation of one of the blocks or sections of the camera separated from the other section and showing the lens and lens-carrier or barrel in vertical or transverse section.

Figure 7 is a view similar to Figure 5 of the other section or block, most of the parts being removed as they will be observed installed in the section or block shown in Figure 5.

Figure 8 is a view similar to Figure 5, showing the lens carrier or barrel in a position for focusing, and also showing the film gauge or counter in detail.

Figure 9 is a perspective showing the lens-carrier or barrel removed from the camera.

Figure 10 is a perspective of one of the film-moving elements detached from the lens-carrier or barrel and removed from the camera.

Figure 11 is a perspective of the film guide plate and negative window removed from the camera.

Fig. 12 is a section line 12—12 of Fig. 2.

Figure 1:
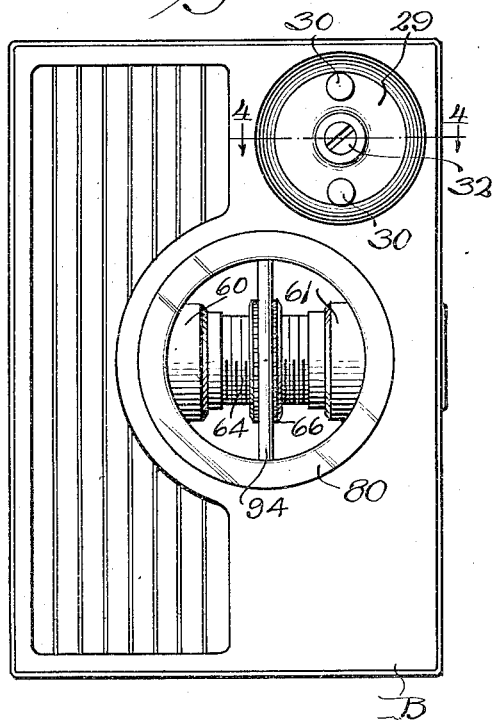
Figure 1 is a vertical side elevation of my improved camera looking at the side from which the shutter is operated.

In the drawings, so far as practicable, I have employed similar reference characters to designate like parts wherever the same appear throughout the several views. The drawings may be regarded as diagrammatic and they illustrate a typical or preferred embodiment of my invention but it will be understood that modifications are obviously possible without departing from the principles set forth in the appended claims.

Figure 3:
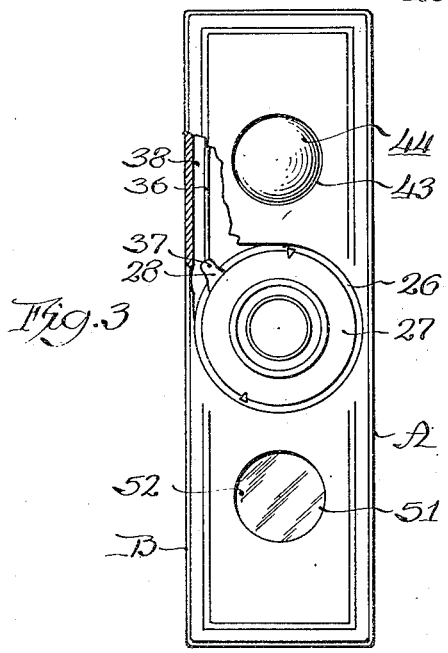
Figure 3 is a vertical front elevation of the camera showing the extremely small dimensions thereof and having a portion broken broken away at one side.
Figure 5:
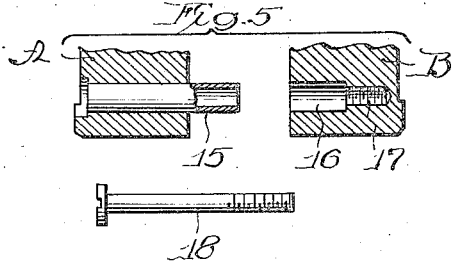
Figure 5 is a transverse section on line 5—5 of Figure 2 illustrating the manner of connecting the sections or blocks together in assembly.

The body of the camera, which might for convenience be termed the casing or housing, is preferably in the form of two sections or blocks, designated as A and B, which are formed from some light readily mouldable and workable material such as "bakelite," hard rubber or the like. In the fabrication of the casing or housing, I prefer to cast the sections A and B in a suitable mould so that the divers passageways or bores will be properly located and shaped and thereafter very little machining or finishing will be required. In other words, the two sections are cast as substantial counter-parts, each section having a longitudinal one-half of each passageway so that when the sections are assembled face to face the complete passageways will be formed. The two sections or blocks are shown respectively in Figures 6 and 7, the block B at the right (Figure 7) having been lifted off and laid over alongside the section or block A (Figure 6). In order to secure the blocks or sections together in assembly, one of the sections is provided with hollow dowel pins or tubes 15 projecting from its face that will engage with the inner face of the block B and near the transverse edges thereof, which tubes are inserted in alining holes 16 in the block B. These holes 16 are provided at their inner ends with threads 17 so that after the faces of the blocks have been brought together, with the pins or tubes 15 inserted in the respective holes, an elongated screw or bolt 18 may be inserted into each of the tubes and screwed into the threaded portions so that the sections are thus drawn together and firmly joined to provide a light-proof casing or body, as will be seen in Figure 3. I have illustrated schematically in Figure 5 this manner of assembly.

At the back of each section and in the upper portion thereof there is a substantially D-shaped recess 19, the curved portions being of semi-circular outline, and correspondingly shaped recesses 20 are formed in the lower portion of the back of each section. A film container having two compartments 21 and 22 shaped to fit the recesses 19 and 20 is placed in these recesses, and the connecting wall or neck 23 of the film container extends between the recesses 19 and 20, as shown in Figure 6, so that the film may be passed from one of the compartments thereof to the other. This film container forms no portion of the present application and is illustrated and described in detail in my co-pending application for patent filed even date herewith, (Case 1557), and said container is retained in position against removal by means of a light-proof slide plate 24 operating in grooves 25 formed in opposite sides of the sections A and B and the back of the camera.

Figure 4:
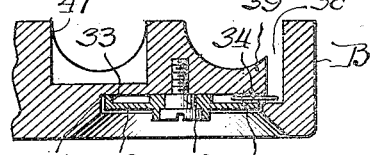
Figure 4 is a transverse horizontal section on line 4—4 of Figure 1 showing the connection between the shutter and the operating device.

A recess 26 is formed centrally in the front of the camera casing and is shallow and of cylindrical shape so as to receive the shutter and diaphragm unit 27 of the camera. This element may be of any standard type or well-known make and, therefore, need not be described except to state that it contains the usual diaphragm which may be enlarged or reduced to control the quantity of light passing through the same and is also provided with a shutter which may be controlled as to speed and for bulb or time exposure. The casing of the shutter and diaphragm element has a lateral pin 27$^a$ projecting from its back wall that fits a recess in the camera body and prevents the rotation of the element. The shutter is controlled by means of a lever 28 projecting from the actuating mechanism out through the casing of the element 27 and it is actuated by suitable means upon the exterior of the section B of the casing. This actuating means preferably comprises a disk 29 having finger engaging projections 30 extending from its outer face and it is rotatably mounted in a counter-sunk recess 31 formed in the exterior surface of the section B. A shouldered screw or bolt 32 secures the disk in position, as seen in Figure 4, so that the disk may be readily rotated. The inner face of the disk is provided with an annular flange 33 which at a suitable point is cut away as at 34 to provide a notch to receive the adjacent lateral end 35 of a wire link 36 that extends down to the lever 28 of the diaphragm unit where said link has a laterally bent end 37 that is pivotally connected to said shutter lever 28. The link 36 extends through a longitudinal slot 38 that opens into the recess 26 and at its upper end connects with the counter-sunk recess 31 through a lateral bore 39. Thus the disk 29 may be rotated slightly upon its axis and such rotation reciprocates the rod 36 which in turn actuates the lever 28 to operate the shutter.

Above the shutter and diaphragm unit 27 the sections A and B of the casing are bored horizontally and vertically adjacent the upper forward corner to provide a finder passageway, the vertical portion 40 of the passageway being provided at its outer end with a lens 41 set in an annular groove 42 and the outer portion of the horizontal portion 43 of the passageway is provided with a lens 44 set in an annular groove 45, the respective portions 40 and 43 being preferably at a right angle to each other. A reflecting element or mirror 46 is positioned obliquely at the intersection of the axes of the two portions 40 and 43 of the passageway, so that light and images received upon the reflector element or mirror 46 from the lower lens 44 will be directed to the upper lens 41 where they may be viewed by the operator of the camera. This finder structure is employed for the purpose of locating the object or image to be photographed and thereafter the photographic lens is to be focused upon the object or image in the novel manner that will later be described herein.

A focusing passageway 47 extends downwardly from the upper end of the casing and is of rectangular shape in cross section at its upper portion and merges into a circular or cylindrical section as at 48 adjacent the central portion of the casing. There is a large transverse aperture or opening 49 extending from side to side of the camera casing to provide a bearing in which the lens and its carrier are mounted, and as seen the focusing passageway 47 has a continuation designated as 50 upon the opposite side of the aperture or opening 49, which continuation passageway is designated as 50. The focal axis of the camera, of course, is through the center of the shutter and diaphragm unit 27 and I have provided a lateral extension 51 of the focusing passageway at the lower end of the portion 50 thereof, which lateral portion extends through the front of the casing and with its axis the same distance from the focal axis of the camera as the axis of the horizontal portion 43 of the finder passageway heretofore described. Adjacent the forward end of the passageway 51 I mount a clear glass plate 52 in an annular groove 53 and at the intersection of the axes of passageways 50 and 51 is positioned an obliquely disposed mirror or other reflecting element 54. A clear glass or lens 55 is mounted in a groove 56 at the upper end of the focussing passageway 47 and below the same is placed a ground glass plate 57 upon which the image will be observed when the lens is focussed, as will hereinafter appear, and said ground glass 57 is the same distance from the center of the lens unit, or the center of the opening 49, as is the negative film at the rear of the camera.

Back of the outer surfaces of the sections A and B of the casing the diameter of the transverse opening or bearing 49 is increased as at 58, so that a shoulder is formed at each end to prevent accidental displacement of the lens mounting cylinder or barrel 59. This lens-carrying barrel or cylinder is shown in detail in Figure 9 of the drawings and it will be noted the same is hollow and is provided with diametrically opposite tubular embossments 60 and 61 and their bores are threaded as at 62 and 63 respectively. The bores of these embossments are alined axially with each other so that exteriorly threaded lens tube 64 may be rotated in the respective embossments. The usual photographic lens system 65 is secured inside the tube 64 preferably centrally of the length thereof and the tube is adapted to rotate upon its axis by means of a knurled ring or annulus 66 that is threaded thereon and adjustably secured in position by a set screw 67. The lens-carrying cylinder or barrel is provided with radial alining bores 68 and 69 that form continuations of the tubular stubs or embossments 60 and 61 so that there is a light passageway extending transversely and transaxially through the barrel and when said barrel and the lens tube are in the position shown in Figures 1, 2 and 6, this passageway will be axially alined with the diaphragm and lens unit 27 and light passing therethrough will be directed to the sensitized film at the rear of the camera. The casing or housing, back of the barrel 59 and opposite the shutter and diaphragm unit 27, is provided with a light passageway 70, the upper and lower walls of which diverge from the barrel toward the film. As seen in Figures 6, 7 and 8 the walls between the D-shaped recesses 19—20 and the intermediate light passageway 70 diminish in thickness towards the rear of the casing and grooves 71 and 72 are provided in the surfaces of these walls facing into the recesses 19 and 20. A combined film guide member and framer, such as shown in Figure 11, is mounted in the rear end of the passageway 70 and consists of a plate 73 provided with a substantially central rectangular opening or picture aperture 74 and has its upper and lower end edges bent laterally to provide horizontal flanges 75 and 76, which flanges, as seen in the drawings, are bowed inwardly towards each other at their outer edges, so as to fit into the grooves 71 and 72 heretofore mentioned. The picture aperture 74 is provided at its lower edge with slots 77 that open into the bottom of the aperture and extend down to the point where the edge of the plate is bent to provide the bottom flange 76. When the film container is placed in the camera, the neck or connecting portion 23 across which the film is moved is positioned so as to provide a film passageway between it and the apertured plate 73 and maintains the film smooth against the adjacent surface of the plate 73 so that the marginal perforations in the film will be disposed along the vertical edges of the picture aperture 74 and will be back of the slots 77 so that when the film is moved downwardly by the actuating mechanism successive unexposed areas of the film will be positioned back of the picture aperture 74.

Figure 2:
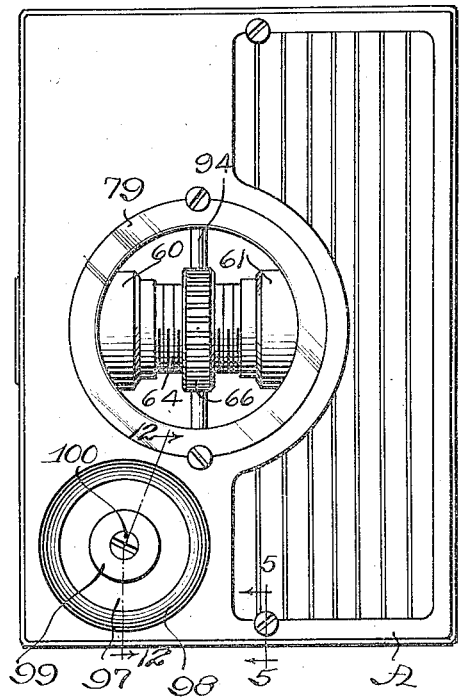
Figure 2 is a vertical side elevation of the opposite side of the camera.

The barrel 59 is reduced at its outer end edges to provide a shoulder 78 at each end, which will be adjacent the shouldered portion of the opening 49, and in order to provide a light-proof structure, I secure the bezels 79 and 80 to the exterior of the respective sections A and B of the housing, as shown in Figures 1 and 2 of the drawings. Back of the shoulders 78 the barrel is provided with annular grooves 81 so that a bead 82 is formed adjacent each end of the barrel between the respective shoulders and grooves. The film engaging and moving elements, one of which is shown in perspective in Figure 10, consist each of a ring or annulus 83 that is of sufficient internal diameter to fit over the reduced or shouldered end of the barrel and to engage the adjacent edge or wall of the bead 82. These annuli are each provided with a radial or lateral arm 84 that projects therefrom away from the barrel into the light passageway 70 alongside the vertical wall of the latter, and upon its outer end each arm is provided with a film engaging finger or dog 85 that is pivotally mounted thereon by means of a screw or pin 86 and has a lateral tapered end portion 87. Back of its pivot, each dog is provided with an enlargement 88 that is engaged by a spring 89 so that the dogs are kept pressed towards the film and are assisted in maintaining their relative positions by means of a short guide pin 90 projecting from opposing faces of the respective dogs. These pins 90 bear against the adjacent portions of the plate 73 at the vertical sides of the light aperture 74 and the tapered lateral ends 87 of the dogs enter the aperture and operate therein and also in the grooves 77 at the lower end of the aperture when the barrel 59 is rotated upon its axis. In order to maintain the respective film moving arms 84 and their connected rings or annuli 83 upon the barrel, the arms 84 are each provided with substantially L-shaped lugs 91 that assemble with the barrel by inserting them laterally into the grooves 81 through notches 92 made in the outer edges of the beads 82 and then, by slight rotational movement of the film moving elements with respect to the barrel, the L-shaped lugs 91 will be movably positioned in the grooves 81 with the shoulder 93 formed by the L-shaped lugs 91 engaging with the outer surfaces of the beads 82. In order to facilitate the rotation of the barrel or cylinder 59, I provide a transverse or diagonal bar 94 that may be conveniently reached by the operator upon the right-hand side of the camera when the same is being held in position to take the picture. In order to actuate the film moving arms, and their connected fingers each of the grooves 81 is provided with stops in the form of pins 95 and 96. When the barrel 59 is being rotated in the direction indicated by the arrow in Figure 8, the stop-pin 96 will be moved away from the extension 91 of the arm and pin 95 will then come into engagement with the opposite edge of the extension and move the arm downward to the position shown in Figure 6, thus causing the lateral ends 87 of the dogs to engage the perforations in the margins of the film and move the film downward until a succeeding unexposed portion of the negative has been brought back of the picture aperture 74 of the film guide plate 73.

In connection with the film feeding mechanism, I have provided an indicator in the form of a scale or dial 97 that is actuated step-by-step each time the barrel or lens mounting barrel 59 is given a rotary reciprocatory movement to actuate the film. The indicator dial 97 is rotatably mounted in a counter-sunk recess 98 in the lower forward corner of the casing section or block A and is provided with the knurled hub 99 through which the shouldered bolt or screw 100 passes. At the bottom of this recess or depression 98 is placed a flat disk 101 of slightly less diameter than the recess which has a lateral lug 102 to which is secured a spring pawl 103 that engages the edges of a ratchet disk 104 that is rotatably mounted upon the shank of the retaining screw 100. Interposed between the ratchet disk 104 and the disk 101 is another disk 105 having a mutilated edge as at 106 in Figure 8 and which is provided with a radial outwardly-extending finger 107. This finger 107 is long enough to extend into the adjacent groove 81 in the barrel 59 where it is engaged by stop-pins 108 and 109 mounted in the channel, one of which are adapted to engage the finger 107 at the end of each rotative movement of the barrel and move it a slight distance with the barrel. The finger 107 is positioned in a channel 110 that connects the recess 98 with the central opening or aperture 49 in the block or section A of the camera casing and this channel 110 is of sufficient width to permit of a slight oscillatory movement of the finger so that the latter will strike the side walls thereof when moved in either direction by the respective stop-pins 108 and 109, so that it will thereby limit the rotational movement of the barrel or lens-mounting cylinder 59. A spring pawl 111 is secured to either the disk 105 or the finger 107 and it is positioned so that it will engage the teeth of the ratchet disk 104 and rotate the same when the finger is moved to the right in Figure 8, which is the direction the barrel is moved to feed the film. The dial 97 and the ratchet 104 are connected by means of a transverse pin 112 so that they will rotate together and the operator may readily ascertain from the dial how many pictures have been taken and how many unexposed negatives remain on the strip of film in the storage compartment.

When the camera is in use the operator will hold the same in a vertical position with the diaphragm and shutter unit 27 towards the object to be photographed and may readily ascertain the direction by looking down into the "finder" passageway 40 through the lens 41, which will receive the image from the mirror or reflector 46. The barrel 59 is then positioned with the lens system in preferably vertical axial alinement with the passageway 47, in which position the image will be received through the clear glass 52 and be reflected by the mirror 54 upwardly through the lens system to the ground glass 57 where it may be viewed. By rotating the ring 66 the lens system may be readily adjusted or focused until the image is observed in clear, sharp lines upon the ground glass 57. As before stated, this image-receiving ground glass screen is the same distance from the lens as is the film at the back of the light passageway 70, so that images focused upon the ground glass 57 will be in focus upon the sensitized film when the barrel has been moved to a picture taking position. After focusing the image as above mentioned the operator will rotate the barrel 59 in a reverse direction to bring the lens system with its axis at a right angle to the axis at which the image was focused, in which position the apparatus is ready for the taking of a picture. When the barrel 59 has been moved, as last above described, the pins 95 will have been moved far enough to engage and move the arms 84, which in turn engage or enter perforations in the margin of the film and move the latter to bring the next unexposed area of the film into position back of the opening 74 in the film guide plate. At the same time this movement of the barrel transfers the stop-pin 109 to a position where it engages and moves the finger 107 of the indicator device to move the dial one step to show that another negative has been exposed and when the finger 107 engages the opposite edge or wall of the passageway of the channel 110, it will stop the further rotation of the barrel and the parts moved thereby. With the structure above described, it will be seen the lens system is moved to a focusing position until its axis is in a plane at a right-angle to the position it will assume when the negative is to be exposed and the picture taken, and the movement of the lens-supporting structure from the focusing position to the photographing position causes the film to be moved to position the next negative space in alinement with the lens, so that the liability of taking two pictures or a double exposure upon a single negative space is avoided.

A suitable lamp house may be attached to the back of the camera and by removing the slide plate 24 a positive film may be moved step-by-step past the light aperture and the lens may be employed to project the picture upon the screen at a distance from the camera. Also by superposing a developed negative film upon an unexposed film, the two films may be moved step-by-step past the light aperture and by placing a lamp house axially in front of the diaphragm and shutter unit, the negative impressions may be printed upon the unexposed film and a series of positive pictures thereby secured. By employing the lamp house and projecting the negative picture upon a piece of sensitized paper, upon which the negative has been properly focussed, in a dark-room, the negative will produce a positive enlargement upon the paper which may be developed in the usual manner.

What I claim is:

1. In a camera having a sensitized member, a lens mounted to focus through a finder in one plane and movable to an angle thereto for making a photographic exposure, and means actuated by the lens whereby to move the sensitized member during a portion of its movement.

2. In a camera having a sensitized member, a lens bodily rotatable upon an axis parallel to its focal axis, and means actuated by the lens whereby to move the sensitized member.

3. In a camera having a sensitized member, an element at an angle to the sensitized member upon which an image may be viewed, a lens normally co-acting with the sensitized member and movable to a position to co-act with said element, and means actuated by said lens adapted to move the sensitized member when the lens is returned to its normal position.

4. In a camera, a photographic lens movable to an angle to the normal plane in which a sensitized member is exposed therethrough whereby said lens may be focused upon the image-receiving screen and means actuated by said lens adapted to move the sensitized member when the lens is returned to its normal plane.

5. In a camera having a sensitized member, a casing, an apertured diaphragm in front of the sensitized member, a barrel rotatable upon an axis transverse to the axis of the above-mentioned photographic elements and having operative connection with the sensitized member, a lens mounted in and bodily movable with said barrel whereby the lens may be positioned in the axis of said photographic elements and may be moved to an angle thereto for observing and focusing the lens upon the image to be photographed and means actuated by the movement of the lens and barrel in one direction adapted to move the sensitized member.

6. In a camera, a casing provided with a plurality of light passageways, a lens and lens carrier one of which is rotatable with respect to the other whereby the lens is axially alined with the respective passageways, the lens adapted to be focused through one of said passageways and adapted to photograph upon a sensitized member through another passageway.

7. In a camera, a photographic lens movable longitudinally on its axis to focus the same with respect to the image to be photographed, an element in which said lens is mounted and having rotational movement upon an axis intersecting the axis of the lens, whereby the lens is adapted to be focused upon the image in one plane and movable to an angle thereto to direct the image upon a sensitized member, and means actuated by the movement of the lens in one direction adapted to move the sensitized member.

8. In a camera, a casing, a shutter and diaphragm element therein, means for positioning a photographic member in a plane transverse to the axis of said element, a lens disposed with its axis in registry with the axis of said element, said casing provided with a focusing passageway extending transverse to the axis of said element, and means carrying said lens and rotatable upon an axis at the intersection of the axes of said element and said passageway whereby the lens may be moved into registry with said passageway to focus the same upon the image to be photographed.

9. In a camera having a sensitized member, a lens mounted to focus through a finder in a given plane, means in which the lens is mounted and movable to an angle to the focusing plane to photograph the image focused through the finder, and devices actuated by said means for intermittently moving the sensitized member.

10. In a camera having a sensitized member, a lens bodily rotatable upon an axis parallel to its focal axis whereby to position the lens in a plurality of positions, and means actuated by the movement of the lens from one position to another and adapted to intermittently move the sensitized member.

11. In a camera having a sensitized member, a lens adapted to photograph an image upon the sensitized member, means in which the sensitized member is mounted adapted to position the lens with its axis at an angle to its axis when co-ordinated with the sensitized member, and devices operated by said means and adapted to engage and move the sensitized member from one position to another.

12. In a camera having a sensitized member, an image-forming lens, a holder in which the lens is mounted and which is movable to a plurality of positions to thereby position the lens in a plurality of image-receiving planes, the image adapted to be viewed and focused through the lens when the latter is in one position and to be photographed upon the sensitized member when the lens is in another position, and means having operative connection with said holder and engaged with the sensitized member during a movement of the holder whereby to move the sensitized member.

13. In a camera having a sensitized member, a lens carrier and lens, a casing provided with a plurality of passageways leading from the lens, the sensitized member being positioned in one of said passageways, said carrier and casing being capable of rotational movement the one with respect to the other whereby to focus an image through the lens in one passageway of the casing and to photograph the image upon the sensitized member through the lens in another passageway.

14. In a camera having a sensitized member, a lens, a lens carrier, a casing provided with a plurality of passageways leading from the lens, and devices operating upon the sensitized member and adapted to intermittently move the latter during a relative movement between said carrier and casing.

15. In a camera having a sensitized member, a casing, a focusing lens having rotational movement independent of its focusing movement, a rotatable barrel in which the lens is mounted, and arms projecting from said barrel and adapted to move the sensitized member when said barrel is rotated in a predetermined direction.

Signed at Davenport, in the county of Scott, and State of Iowa, this 26th day of May, 1926.

ALEXANDER FERDINAND VICTOR.